(12) United States Patent
Wu et al.

(10) Patent No.: US 9,148,583 B2
(45) Date of Patent: Sep. 29, 2015

(54) FLICKER DETECTION METHOD AND FLICKER DETECTION APPARATUS

(71) Applicant: FUJITSU LIMITED, Kawasaki-shi, Kanagawa (JP)

(72) Inventors: Jianrong Wu, Beijing (CN); Xuan Fu, Beijing (CN); Akihiro Higashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/336,281

(22) Filed: Jul. 21, 2014

(65) Prior Publication Data

US 2015/0022686 A1    Jan. 22, 2015

(30) Foreign Application Priority Data

Jul. 19, 2013    (CN) .......................... 2013 1 0305736

(51) Int. Cl.
*H04N 5/235* (2006.01)
*H04N 5/14* (2006.01)

(52) U.S. Cl.
CPC ............. *H04N 5/2357* (2013.01); *H04N 5/144* (2013.01)

(58) Field of Classification Search
CPC .............................. H04N 5/2357; H04N 5/144
USPC ....................................................... 348/226.1
See application file for complete search history.

(56) References Cited

U.S. PATENT DOCUMENTS

| | | | |
|---|---|---|---|
| 6,466,624 B1 | 10/2002 | Fogg | |
| 6,710,818 B1 * | 3/2004 | Kasahara et al. | 348/607 |
| 7,911,505 B2 * | 3/2011 | Pillman et al. | 348/226.1 |
| 8,670,043 B2 * | 3/2014 | Shinmei et al. | 348/228.1 |
| 2005/0046704 A1 | 3/2005 | Kinoshita | |
| 2005/0093996 A1 | 5/2005 | Kinoshita | |
| 2006/0061669 A1 | 3/2006 | Jang et al. | |
| 2010/0013953 A1 | 1/2010 | Niikura | |
| 2010/0045819 A1 | 2/2010 | Pillman et al. | |

(Continued)

FOREIGN PATENT DOCUMENTS

| | | |
|---|---|---|
| EP | 1091571 A2 | 4/2001 |
| KR | 10-2005-0006045 | 1/2005 |
| KR | 10-2011-0082628 | 7/2011 |
| WO | 2010054484 | 5/2010 |

OTHER PUBLICATIONS

Extended European Search Report dated Nov. 26, 2014 in corresponding European Patent Application No. 14176514.9.

(Continued)

*Primary Examiner* — James Hannett
(74) *Attorney, Agent, or Firm* — Staas & Halsey LLP (57) ABSTRACT

The present invention discloses a flicker detection method and a flicker detection apparatus. The method includes: calculating the mean values of selected rows of image frames to constitute a mean value vector; calculating a differential vector between the mean value vectors of a current frame and a previous frame; calculating a DC-free difference vector by subtracting a direct current component from respective elements of the differential vector; calculating a power spectrum corresponding to the DC-free difference vector; obtaining a first frequency reference value; obtaining a second frequency reference value; and if the difference between the first and second frequency reference values is above a threshold, then it is determined that flicker is present in the current frame; otherwise, it is determined that no flicker is present.

21 Claims, 7 Drawing Sheets

(56) References Cited

U.S. PATENT DOCUMENTS

| | | |
|---|---|---|
| 2010/0123810 A1* | 5/2010 | Greenland et al. ............ 348/294 |
| 2010/0157093 A1 | 6/2010 | Fuchikami et al. |
| 2011/0205394 A1 | 8/2011 | Fuchigami |
| 2012/0081570 A1 | 4/2012 | Hsieh |

OTHER PUBLICATIONS

Korean Office Action mailed Jun. 18, 2015 in corresponding Korean Application No. 10-2014-0091053.

* cited by examiner

FLICKER DETECTION METHOD AND FLICKER DETECTION APPARATUS

CROSS REFERENCE TO RELATED APPLICATION

This application claims priority to Chinese Patent Application No. 201310305736.5, filed on Jul. 19, 2013 and entitled "FLICKER DETECTION METHOD AND FLICKER DETECTION APPARATUS", contents of which are incorporated herein by reference in its entirety.

FIELD OF THE INVENTION

The present invention generally relates to signal processing and in particular to a method and an apparatus capable of detecting flicker in a sequence of image frames.

BACKGROUND OF THE INVENTION

In recent years, CMOS image sensors have been widely applied to various image capturing devices, e.g., a digital picture camera, a digital video camera, a mobile phone, etc. Due to different photo-electric conversion time of respective pixels or rows of pixels in the course of photo-electric conversion, there may be bright and dark horizontal strips in a captured image, especially in the case that the image is captured under fluorescent lighting or some other lighting condition with periodically changing brightness. Such a horizontal stripe in the captured image arising from periodically changing lighting is referred to "flicker".

An exposure period of time can be set reasonably dependent upon the frequency of flicker to suppress and even eliminate flicker in the captured image. This necessitates the detection of the presence of flicker and the frequency of flicker.

Traditional method of detecting the presence of flicker and the frequency of flicker suffer from the disadvantages of poor detection accuracy, a low detectable rate and being subjected to a considerable influence from motion in a sequence of image frames.

Thus, there is a need of a flicker detection method and a flicker detection apparatus capable of detecting flicker in a sequence of image frames efficiently and accurately and further capable of being subjected to an inconsiderable influence from motion in the sequence of image frames.

SUMMARY OF THE INVENTION

The following presents a simplified summary of the invention in order to provide basic understanding of some aspects of the invention. It shall be appreciated that this summary is not an exhaustive overview of the invention. It is not intended to identify key or critical elements of the invention or to delineate the scope of the invention. Its sole purpose is to present some concepts in a simplified form as a prelude to the more detailed description that is discussed later.

In view of the foregoing problems in the prior art, an object of the invention is to provide a method and an apparatus capable of detecting flicker in a sequence of image frames efficiently and accurately. The flicker detection method and flicker detection apparatus according to a preferred embodiment of the invention can further be subjected to an inconsiderable influence from motion in the sequence of image frames.

In order to attain the foregoing object, according to an aspect of the invention, there is provided a flicker detection method of detecting flicker in a sequence of image frames, the method including: calculating the mean values of selected rows of the image frames, the calculated mean values constituting a mean value vector mean_row(k) in the order of the rows; calculating a differential vector diff_frame(k) between the mean value vector mean_row(k) of a current frame and the mean value vector mean_row(k−1) of a previous frame; calculating a DC-free difference vector diff_mean_row(k) by subtracting a direct current component of the differential vector diff_frame(k) from respective elements of the differential vector diff_frame(k); calculating a power spectrum corresponding to the DC-free difference vector diff_mean_row(k); obtaining the value of the power spectrum at a first frequency or the mean value of the power spectrum in a predetermined range around the first frequency as a first frequency reference value; obtaining the value of the power spectrum at a second frequency or the mean value of the power spectrum in a predetermined range around the second frequency as a second frequency reference value; if the difference between the first frequency reference value and the second frequency reference value is above a predetermined difference threshold, then it is determined that flicker is present in the current frame; otherwise, it is determined that no flicker is present in the current frame.

According to another aspect of the invention, there is provided a flicker detection apparatus for detecting flicker in a sequence of image frames, the apparatus including: a mean value vector calculating device configured to calculate the mean values of selected rows of the image frames, the calculated mean values constituting a mean value vector mean_row (k) in the order of the rows; a differential vector calculating device configured to calculate a differential vector diff_frame (k) between the mean value vector mean_row(k) of a current frame and the mean value vector mean_row(k−1) of a previous frame; a DC-free difference vector calculating device configured to calculate a DC-free difference vector diff_mean_row(k) by subtracting a direct current component of the differential vector diff_frame(k) from respective elements of the differential vector diff_frame(k); a power spectrum calculating device configured to calculate a power spectrum corresponding to the DC-free difference vector diff_mean_row(k); a first frequency reference value calculating device configured to obtain the value of the power spectrum at a first frequency or the mean value of the power spectrum in a predetermined range around the first frequency as a first frequency reference value; a second frequency reference value calculating device configured to obtain the value of the power spectrum at a second frequency or the mean value of the power spectrum in a predetermined range around the second frequency as a second frequency reference value; and a flicker determining device including a presence determination unit configured: to determine that flicker is present in the current frame, if the difference between the first frequency reference value and the second frequency reference value is above a predetermined difference threshold; and to determine that no flicker is present in the current frame, if the difference between the first frequency reference value and the second frequency reference value is below or equal to the predetermined difference threshold.

Furthermore, according to another aspect of the invention, there is further provided a storage medium including machine readable program codes, which upon execution on an information processing device cause the information processing device to perform the foregoing method according to the invention.

Moreover, according to still another aspect of the invention, there is further provided a program product including machine executable instructions, which upon execution on an information processing device cause the information processing device to perform the foregoing method according to the invention.

BRIEF DESCRIPTION OF THE DRAWINGS

The foregoing and other objects, features and advantages of the invention will be more readily understand from the following description of embodiments of the invention with reference to the drawings. Components in the drawings are merely intended to illustrate the principle of the invention. In the drawings, identical or similar technical features or components will be denoted by identical or similar reference numerals. In the drawings.

DETAILED DESCRIPTION OF THE INVENTION

Exemplary embodiments of the present invention will be described below in conjunction with the accompanying drawings. For the sake of clarity and conciseness, not all the features of practical implementations have been described in the specification. However, it is to be appreciated that numerous implementation-specific decisions shall be made during developing any of such practical implementations so as to achieve the developer's specific goals, for example, to comply with those system- and business-related constraining conditions which may vary from one implementation to another. Moreover, it shall also be appreciated that such a development effort might be very complex and time-consuming but may simply be a routine task for those skilled in the art benefiting from this disclosure.

It shall further be noted here that only those apparatus structures and/or process steps closely relevant to the solutions of the invention will be illustrated in the drawings while other details less relevant to the invention are omitted so as not to obscure the invention due to those unnecessary details. Moreover, it shall be further noted that an element and a feature described in a drawing or an implementation of the invention can be combined with an element or elements and a feature or features illustrated in one or more other drawings or implementations.

A flow of a flicker detection method according to a first embodiment of the invention will be described below with reference to FIG. 1.

Figure 1:
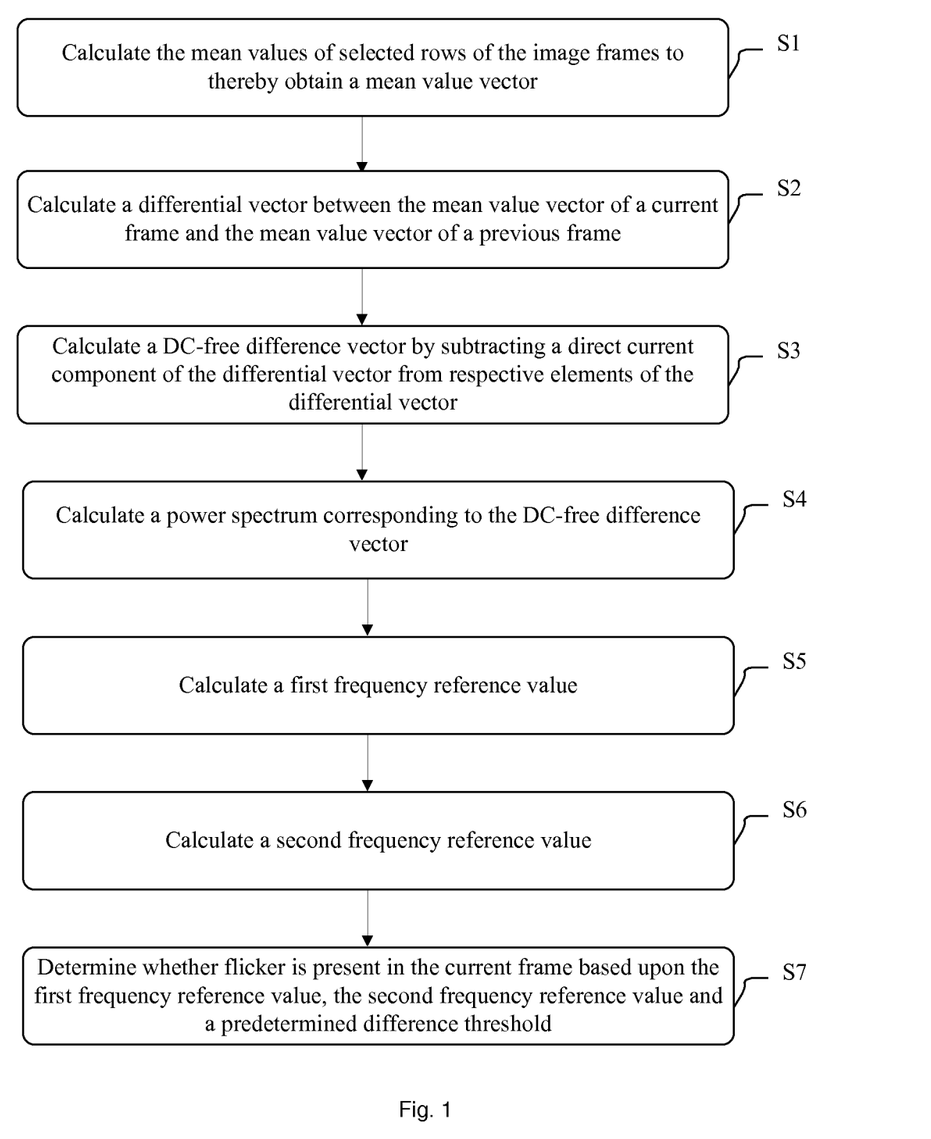
FIG. 1 illustrates a flow chart of a flicker detection method according to a first embodiment of the invention.

FIG. 1 illustrates a flow chart of a flicker detection method according to a first embodiment of the invention. As illustrated in FIG. 1, the flicker detection method according to the invention includes the steps of: calculating the mean values of selected rows of the image frames, the calculated mean values constituting a mean value vector mean_row(k) in the order of the rows (the step S1); calculating a differential vector diff_frame(k) between the mean value vector mean_row(k) of a current frame and the mean value vector mean_row(k−1) of a previous frame (the step S2); calculating a DC-free difference vector diff_mean_row(k) by subtracting a direct current component of the differential vector diff_frame(k) from respective elements of the differential vector diff_frame(k) (the step S3); calculating a power spectrum corresponding to the DC-free difference vector diff_mean_row(k) (the step S4); obtaining the value of the power spectrum at a first frequency or the mean value of the power spectrum in a predetermined range around the first frequency as a first frequency reference value (the step S5); obtaining the value of the power spectrum at a second frequency or the mean value of the power spectrum in a predetermined range around the second frequency as a second frequency reference value (the step S6); if the difference between the first frequency reference value and the second frequency reference value is above a predetermined difference threshold, then it is determined that flicker is present in the current frame; otherwise, it is determined that no flicker is present in the current frame (the step S7).

The respective steps of the flicker detection method according to the first embodiment of the invention will be described below in details.

An object processed by the flicker detection method according to the invention is a sequence of image frames constituted of gray scale images, where it can be determined, according to information of a current frame and a frame previous to the current frame, whether flicker is present in the current frame and further the frequency of flicker.

If image frames in the sequence of image frames are color images, then the color images need to be preprocessed to be converted into gray scale images. A color image can be converted into a gray scale image in any method known in the art, and this relates to general means well-known to those skilled in the art and thus will not be described here again.

The step S1 is to calculate the mean values of selected rows of the image frames, the calculated mean values constituting a mean value vector mean_row(k) in the order of the rows.

An image frame, i.e., an image, is constituted of a number of pixels. These constituent pixels are arranged in rows and columns. If the height of an image frame is denoted as height, and the width of the image frame is denoted as width, then the image frame includes height rows and width columns of pixels.

Selected rows of an image frame can be all of rows of the image frame or can be sampled rows as a result of sampling all of rows of the image frame uniformly. The use of sampled rows for calculation can effectively lower the amount of calculation and improve the processing speed. A description will be given below taking sampled rows as an example.

For example, an image frame can be sampled so that the number of selected rows of the image frame is uniformly 256. Accordingly, a sampling interval can be calculated in the equation of:

$$\text{Sampling interval} = \text{floor}(\text{height}/256).$$

Where floor( ) represents a rounding-down function, and height represents the height of an image frame. It shall be noted that 256 here are merely exemplary. Those skilled in the art can select the number of sampled rows flexibly as needed for the design of a system.

The i-th row among the sampled rows, i.e., the iRow-th row of the image frame, is iRow=(i−1)×floor(height/256)+1.

Where frame (k, Row, Col) represents data of the k-th frame at the Row-th row and the Col-th column, k represents the sequence number of the frame and takes an positive integer, Row and Col represent the sequence numbers of the row and the column respectively and also take positive integers.

Pixel values of all the pixels at each selected row of the k-th image frame are averaged into a mean value of the selected row, and the mean values of all the selected rows of the image frame are arranged in the order of the rows into a mean value vector mean_row(k) of the image frame.

The mean value of the i-th sampled row of the k-th frame can be represented as, mean_row(k,i)=mean(frame(k, iRow,:)), where mean( ) represents an averaging function, and the symbol ":" represents all the columns.

The step S2 is to calculate a differential vector diff_frame (k) between the mean value vector mean_row(k) of a current frame and the mean value vector mean_row(k−1) of a previous frame.

That is, diff_frame(k)=mean_row(k)−mean_row(k−1).

Evidently, this step is performed on the precondition that the current frame is a second or later frame of the sequence of image frames, where there is a previous frame of the current frame.

If there are 256 sampled rows as a result of row-sampling of each frame, then the number of elements of mean_row(k) is 256. Accordingly, the number of elements of the differential vector diff_frame(k) is also 256.

The step S3 is to calculate a DC-free difference vector diff_mean_row(k) by subtracting a direct current component of the differential vector diff_frame(k) from respective elements of the differential vector diff_frame(k).

That is, diff_mean_row(k)=diff_frame(k)−mean(diff_frame (k)).

Where mean(diff_frame(k)) represents a direct current component of the differential vector diff_frame(k), which can be derived by averaging all the elements of the differential vector diff_frame(k).

Due to the difference between data of different frames, particularly the considerable difference between direct current components, the removal of a direct current component can result in relatively low values of elements of a DC-free difference vector and strong comparability of DC-free difference vectors of different frames to thereby facilitate a uniform design of respective thresholds used in the subsequent steps.

The step S4 is to calculate a power spectrum corresponding to the DC-free difference vector diff_mean_row(k).

The calculation of a power spectrum is well-known to those skilled in the art.

Particularly, firstly an autocorrelation function xcorr of the DC-free difference vector diff_mean_row(k) is calculated in the equation of:

xcorr=corr(diff_mean_row(k),diff_mean_row(k)),

Where corr( ) represents an autocorrelation function.
The foregoing equation is expanded into:

$$xcorr(m) = \frac{1}{NN-m} \sum_{0}^{NN-1-|m|} \text{diff\_mean\_row}(n) \cdot \text{diff\_mean\_row}(n+|m|), \ |m| < NN$$

Where NN represents the length of the DC-free difference vector diff_mean_row(k). It shall be noted that in a fourth embodiment to be described below in details, the introduction of motion detection makes the length of the DC-free difference vector diff_mean_row(k) with the presence of motion shorter as compared with the length of the DC-free difference vector diff_mean_row(k) with the absence of motion. At this time, the value of NN shall be adjusted accordingly to ensure NN to be equal to the length of the DC-free difference vector diff_mean_row(k).

Then, the autocorrelation function is translated into corresponding frequency-domain data FFT_xcorr in the frequency domain through time domain-frequency domain translation calculation. A method of time domain-frequency domain translation calculation is well-known to those skilled in the art, for example, time domain-frequency domain translation calculation can be performed through Fast Fourier Translation (FFT) as illustrated below:

FFT_xcorr=|FFT(xcorr,nfft)|, and nfft=floor((height·FPS)/floor(height/256)),

Where FFT( ) represents Fast Fourier Translation, nfft represents FFT with an nfft-point FFT operation, FPS represents the frame rate of an image frame, and as mentioned above, floor( ) represents a rounding-down function, height represents the height of the image frame, and floor(height/256) represents a row sampling interval.

At this time, frequency-domain data corresponding to the positive frequency axis is selected in the frequency domain as a power spectrum.

Figure 2:
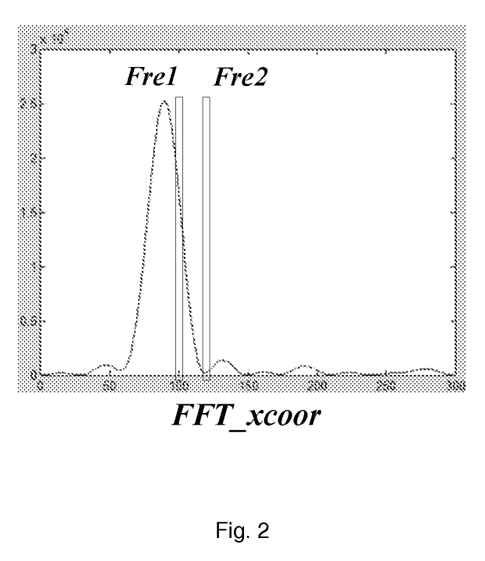
FIG. 2 illustrates an example of a power spectrum of a DC-free difference vector.

That is, FFT_xcorr(1:nfft/2) represents a power spectrum of the DC-free difference vector diff_mean_row(k) (frequency-domain data of values on the frequency axis in the range of 1 to nfft/2) as illustrated in FIG. 2.

FIG. 2 illustrates an example of a power spectrum of the DC-free difference vector diff_mean_row(k).

The step S5 is to obtain the value of the power spectrum at a first frequency or the mean value of the power spectrum in a predetermined range around the first frequency as a first frequency reference value.

That is, the first frequency reference value sum_Fre1(k) can be calculated in the equation of:

$$\text{sum\_Fre1}(k) = \frac{1}{2 \cdot fr + 1} \sum_{n=Fre1-fr}^{Fre1+fr} \text{FFT\_xcorr}(n).$$

Where Fre1 represents the first frequency, and fr represents the predetermined range. With fr=0, the value of the power spectrum at the first frequency is derived. fr can be specified empirically in view of an experimental effect, fr is preferably 0.

Similarly, the step S6 is to obtain the value of the power spectrum at a second frequency or the mean value of the power spectrum in a predetermined range around the second frequency as a second frequency reference value.

That is, the second frequency reference value sum_Fre2(k) can be calculated in the equation of:

$$\text{sum\_Fre2}(k) = \frac{1}{2 \cdot fr + 1} \sum_{n=Fre2-fr}^{Fre2+fr} \text{FFT\_xcorr}(n).$$

Where Fre2 represents the second frequency, and fr represents the predetermined range. With fr=0, the value of the power spectrum at the second frequency is derived. fr can be specified empirically in view of an experimental effect, fr is preferably 0.

Taking a fluorescent lighting environment as an example, flicker arises from the frequency of alternating current. At present, a typical frequency of commercial alternating current all over the world is 50 Hz and 60 Hz. Thus, a frequency possible with flicker (a target frequency) is 100 Hz and 120 Hz.

In the case of a fluorescent lamp powered by commercial alternating current, the first frequency and the second frequency can be equal to 100 Hz and 120 Hz respectively.

The values of a power spectrum are taken at or around predetermined frequencies for the purpose of comparing frequency-domain characteristics of flicker at the predetermined frequencies. Those skilled in the art can adjust the values and the number of predetermined frequencies flexibly dependent upon the need of a design and the scenario of an application.

The step S7 is to make determination. If the difference between the first frequency reference value and the second frequency reference value is above a predetermined difference threshold, then it is determined that flicker is present in the current frame; otherwise, it is determined that no flicker is present in the current frame.

That is, the first frequency reference value and the second frequency reference value reflect the extents of correlation of the frequency of flicker which possibly exists in the current frame with the first frequency and the second frequency.

When the difference between one of the first frequency reference value and the second frequency reference value and the other frequency reference value is sufficiently large, it is determined that flicker is present in the current frame because the frequency of flicker is expected to be one of the two frequencies.

Otherwise, that is, when there is no considerable difference between the first frequency reference value and the second frequency reference value, it is determined that no flicker is present in the current frame also because the frequency of flicker is expected to be one of the two frequencies.

Moreover, in the case that it is determined that flicker is present, the frequency of flicker can be further determined.

If the first frequency reference value is larger than the second frequency reference value, then the frequency of flicker is determined as the first frequency; and if the second frequency reference value is larger than the first frequency reference value, then the frequency of flicker is determined as the second frequency.

That is, when the first frequency reference value is much larger than the second frequency reference value, it is determined that flicker at the first frequency is present; when the second frequency reference value is much larger than the first frequency reference value, it is determined that flicker at the second frequency is present; and when there is no considerable difference between the first frequency reference value and the second frequency reference value, it is determined that no flicker is present.

A method of characterizing the difference between the first frequency reference value and the second frequency reference value can be designed flexibly by those skilled in the art. For example, the difference can be characterized preferably as follows.

The absolute value of the difference between the first frequency reference value sum_Fre1(k) and the second frequency reference value sum_Fre2(k) (diff_sum_Fre(k)) is calculated as follows:

$$\text{diff\_sum\_Fre}(k) = |\text{sum\_Fre2}(k) - \text{sum\_Fre1}(k)|.$$

The ratio of the largest value to the smallest value among the first frequency reference value sum_Fre1(k) and the second frequency reference value sum_Fre2(k) (div_sum_Fre(k)) is calculated as follows:

$$\text{div\_sum\_Fre}(k) = \frac{\max(\text{sum\_Fre2}(k), \text{sum\_Fre1}(k))}{\min(\text{sum\_Fre2}(k), \text{sum\_Fre1}(k))}.$$

A first-level determination result FLFD(k) is calculated in the equation of:

$$FLFD(k) = \begin{cases} Fre1, & \text{div\_sum\_Fre}(k) > \text{Thre\_div} \,\&\&\, \text{diff\_sum\_Fre}(k) > \\ & \text{Thre\_diff} \,\&\&\, \text{sum\_Fre1}(k) > \text{sum\_Fre2}(k) \\ Fre2, & \text{div\_sum\_Fre}(k) > \text{Thre\_div} \,\&\&\, \text{diff\_sum\_Fre}(k) > \\ & \text{Thre\_diff} \,\&\&\, \text{sum\_Fre1}(k) < \text{sum\_Fre2}(k) \\ none, & \text{else} \end{cases}$$

Where && represents AND, Fre1 represents the presence of flicker at the first frequency as a determination result, Fre2 represents the presence of flicker at the second frequency as a determination result, Thre_div and Thre_diff represent corresponding thresholds, none represents no flicker present, and else represents other possibilities. Thre_div can take a number larger than 1, and Thre_diff can take a number larger than 1.

In the first embodiment of the invention, the presence and the frequency of flicker are determined directly in the one-level determination method. In a second embodiment, preliminary determination results of several frames are integrated for further integrated determination leading to a more accurate determination result.

A flow of a flicker detection method according to a second embodiment of the invention will be described below with reference to FIG. 3.

Figure 3:
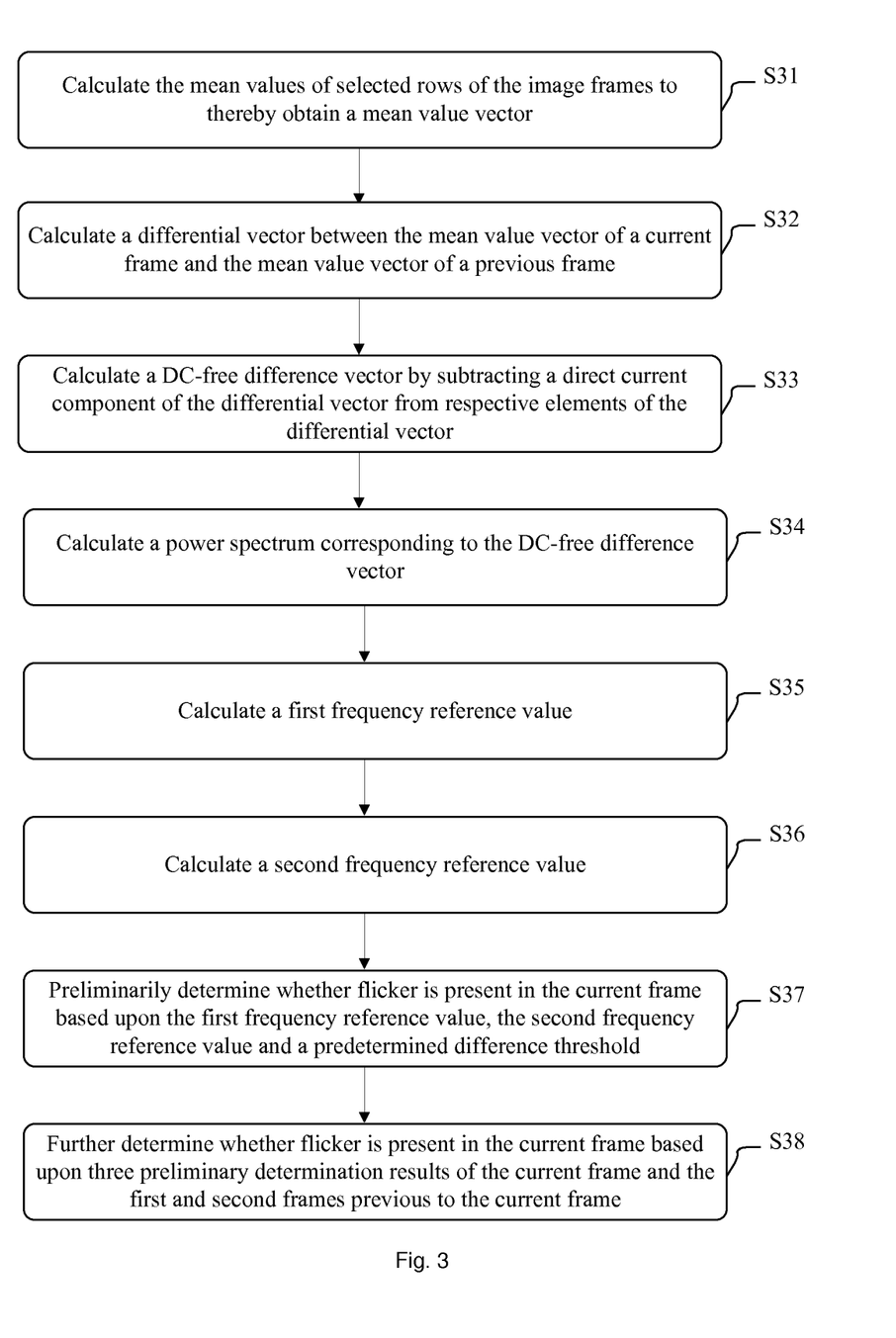
FIG. 3 illustrates a flow chart of a flicker detection method according to a second embodiment of the invention.

FIG. 3 illustrates a flow chart of a flicker detection method according to a second embodiment of the invention. As illustrated in FIG. 3, the flicker detection method according to the invention includes the steps of: calculating the mean values of selected rows of the image frames, the calculated mean values constituting a mean value vector mean_row(k) in the order of the rows (the step S31); calculating a differential vector diff_frame(k) between the mean value vector mean_row(k) of a current frame and the mean value vector mean_row(k−1) of a previous frame (the step S32); calculating a DC-free difference vector diff_mean_row(k) by subtracting a direct current component of the differential vector diff_frame(k) from respective elements of the differential vector diff_frame(k) (the step S33); calculating a power spectrum corresponding to the DC-free difference vector diff_mean_row(k) (the step S34); obtaining the value of the power spectrum at a first frequency or the mean value of the power spectrum in a predetermined range around the first frequency as a first frequency reference value (the step S35); obtaining the value of the power spectrum at a second frequency or the mean value of the power spectrum in a predetermined range around the second frequency as a second frequency reference value (the step S36); if the difference between the first frequency reference value and the second frequency reference value is above a predetermined difference threshold, then it is preliminarily determined that flicker is present in the current frame; otherwise, it is preliminarily determined that no flicker is present in the current frame (the step S37); and for three preliminary determination results of the current frame and the first and second frames previous to the current frame, if at least two of the determination results are that the flicker at the first frequency is present and none of the determination results are that the flicker at the second frequency is present, then it is further determined that the flicker at the first frequency is present in the current frame; if at least two of the determination results are that the flicker at the second frequency is present and none of the determination results are that the flicker at the first frequency is present, then it is further determined that the flicker at the second frequency is present in the current frame; otherwise, it is further determined that no flicker is present in the current frame (the step S38).

The steps S31 to S37 in the second embodiment of the invention are totally the same as the steps S1 to S7 in the first embodiment except for further integrated determination (the step S38) based upon the preliminary (first-level) determination results of the steps S31 to S37.

That is, the step S38 is performed with reference to all the three preliminary determination results of the current frame and the first and second frames previous to the current frame. If at least two of the determination results are that the flicker at the first frequency is present and none of the determination results are that the flicker at the second frequency is present, then it is further determined that the flicker at the first frequency is present in the current frame; if at least two of the determination results are that the flicker at the second frequency is present and none of the determination results are that the flicker at the first frequency is present, then it is further determined that the flicker at the second frequency is present in the current frame; otherwise, it is further determined that no flicker is present in the current frame.

Apparently, in this case, the current frame shall be a third or later frame in the sequence of image frames.

In the second embodiment of the invention, the presence and the frequency of flicker can be determined at two levels in the two-level determination method. In a third embodiment, determination results (second-level determination results) of more frames can be further integrated for integrated determination.

A flow of a flicker detection method according to a third embodiment of the invention will be described below with reference to FIG. 4.

Figure 4:
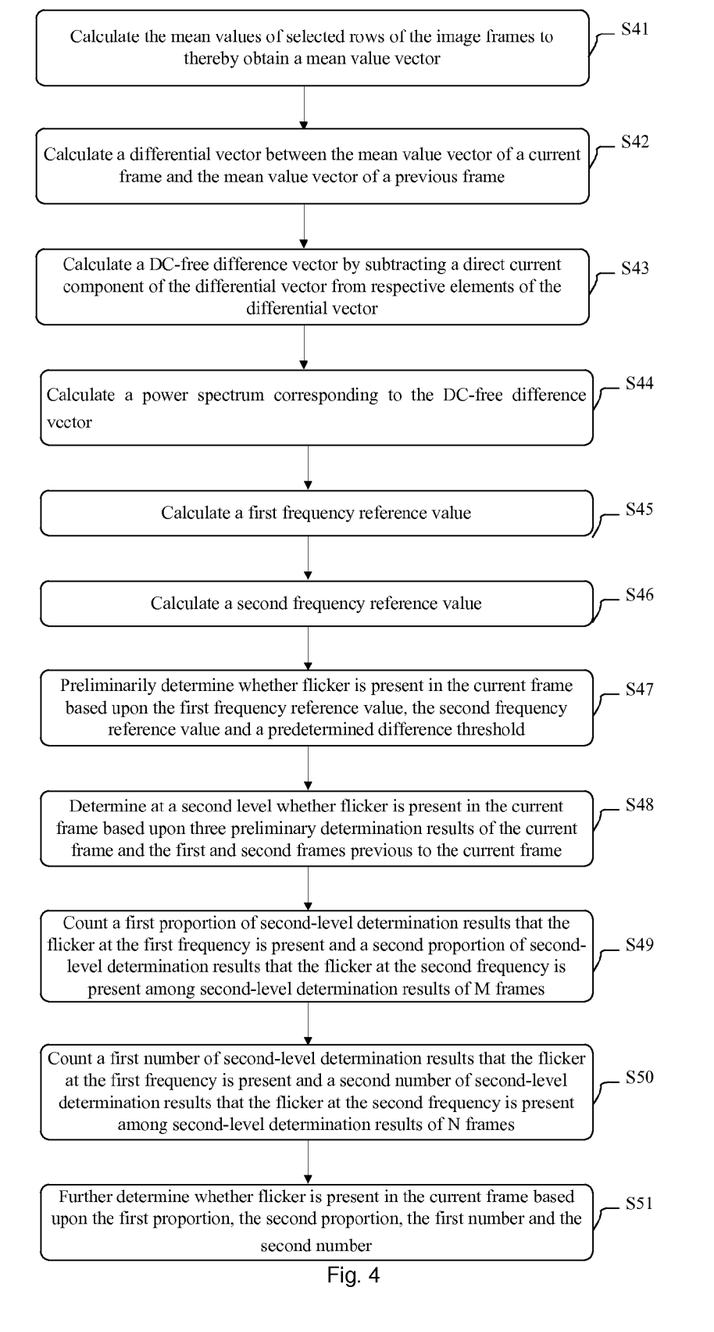
FIG. 4 illustrates a flow chart of a flicker detection method according to a third embodiment of the invention.

FIG. 4 illustrates a flow chart of a flicker detection method according to a third embodiment of the invention. As illustrated in FIG. 4, the flicker detection method according to the invention includes the steps of: calculating the mean values of selected rows of the image frames, the calculated mean values constituting a mean value vector mean_row(k) in the order of the rows (the step S41); calculating a differential vector diff_frame(k) between the mean value vector mean_row(k) of a current frame and the mean value vector mean_row(k−1) of a previous frame (the step S42); calculating a DC-free difference vector diff_mean_row(k) by subtracting a direct current component of the differential vector diff_frame(k) from respective elements of the differential vector diff_frame(k) (the step S43); calculating a power spectrum corresponding to the DC-free difference vector diff_mean_row(k) (the step S44); obtaining the value of the power spectrum at a first frequency or the mean value of the power spectrum in a predetermined range around the first frequency as a first frequency reference value (the step S45); obtaining the value of the power spectrum at a second frequency or the mean value of the power spectrum in a predetermined range around the second frequency as a second frequency reference value (the step S46); if the difference between the first frequency reference value and the second frequency reference value is above a predetermined difference threshold, then it is preliminarily determined that flicker is present in the current frame; otherwise, it is preliminarily determined that no flicker is present in the current frame (the step S47); for three preliminary determination results of the current frame and the first and second frames previous to the current frame, the following second-level determination is made: if at least two of the preliminary determination results are that the flicker at the first frequency is present and none of the preliminary determination results are that the flicker at the second frequency is present, then it is further determined that the flicker at the first frequency is present in the current frame; if at least two of the preliminary determination results are that the flicker at the second frequency is present and none of the preliminary determination results are that the flicker at the first frequency is present, then it is further determined that the flicker at the second frequency is present in the current frame; otherwise, it is further determined that no flicker is present in the current frame (the step S48); counting a first proportion of second-level determination results that the flicker at the first frequency is present and a second proportion of second-level determination results that the flicker at the second frequency is present among second-level determination results of M frames including the current frame and previous M−1 frames thereof (the step S49); counting a first number of second-level determination results that the flicker at the first frequency is present and a second number of second-level determination results that the flicker at the second frequency is present among second-level determination results of N frames including the current frame and previous N−1 frames thereof (the step S50); and if the first proportion is above a first proportion threshold and the second number is below 1, then it is further determined that the flicker at the first frequency is present in the current frame; if the second proportion is above a second proportion threshold and the first number is below 1, then it is further determined that the flicker at the second frequency is present in the current frame; otherwise, it is further determined that no flicker is present in the current frame (the step S51), wherein M and N are integers above 1 and M>N.

The steps S41 to S48 in the third embodiment of the invention are totally the same as the steps S31 to S38 in the second embodiment except for further integrated determination based upon the second-level determination results of the steps S41 to S48.

The step S49 is to count a first proportion of second-level determination results that the flicker at the first frequency is present and a second proportion of second-level determination results that the flicker at the second frequency is present among second-level determination results of M frames including the current frame and previous M−1 frames thereof, where M is an integer above 1. The value of M can be designed flexibly dependent upon conditions of system performance and resources in combination with an experimental effect The step S50 is to count a first number of second-level determination results that the flicker at the first frequency is present and a second number of second-level determination results that the flicker at the second frequency is present among second-level determination results of N frames including the current frame and previous N−1 frames thereof, where N is an integer above 1 and M>N.

The following determination is made in the step S51 based upon results of counting in the step S49 and the step S50: if the first proportion is above a first proportion threshold and the second number is below 1, then it is further determined that the flicker at the first frequency is present in the current frame; if the second proportion is above a second proportion threshold and the first number is below 1, then it is further determined that the flicker at the second frequency is present in the current frame; otherwise, it is further determined that no flicker is present in the current frame Where the first proportion threshold and the second proportion threshold may or may not be equal. Preferably, both the first proportion threshold and the second proportion threshold take a number larger than 0.5.

As compared with the second embodiment, integrated determination is made in a wider range based upon a result of revision with the second-level determination in the third embodiment.

Furthermore, in the third embodiment, M>N is set so that determination can be made according to the proportions of the two determination results (the presence of flicker at the first or second frequency) in a range including the current frame and a larger number of frames previous thereto while making stricter determination in the neighborhood of the current frame.

Moreover, it can be further determined whether there is motion of the current frame relative to the previous frame in the case that it is determined that no flicker is present in the current frame. This determination can be based upon a motion detection process to be described below in details. That is, among output results of the invention, the following several results may exist: the presence of flicker at the first frequency, the presence of flicker at the second frequency, the presence of motion and neither flicker nor motion present.

Of course, in the case that no motion detection is performed, output results of the invention may include: the presence of flicker at the first frequency, the presence of flicker at the second frequency, and no flicker present.

In the first to third embodiments, the presence and the frequency of flicker are determined. In a fourth embodiment to be described below in details, the factor of motion will be further taken into account, and the detectable rate and the accuracy of detection can be further improved by lowering an influence of motion upon flicker determination thanks to smart calculation.

It shall be noted that motion detection introduced and corresponding calculation adjustment made in the fourth embodiment is also applicable to any of the first to third embodiments. For the sake of conciseness, detailed steps thereof will not be enumerated here again, but only a difference of the fourth embodiment from the first to third embodiments will be highlighted.

In the fourth embodiment, motion detection is further performed before the step of building, that is, it is further detected whether there is motion of the current frame relative to the previous frame.

Motion detection can be performed in any method known in the art. In this case, motion detection can be performed at the very beginning of the flicker detection method, and the subsequent steps will be performed based upon a result of motion detection.

Particularly, if the result of motion detection indicates that there is no motion of the current frame relative to the previous frame, then the determination as to flicker can be made as in the flows in the first to third embodiments. If the result of motion detection indicates that there is motion of the current frame relative to the previous frame, then the first three steps in the first to third embodiments may be skipped, but instead calculation can be performed as in a method of calculating a DC-free difference vector with the presence of motion to be described below in details, and then the remaining flows in the first to third embodiments can be further performed.

Moreover, the steps of motion detection can alternatively be arranged after the first three steps in the first to third embodiments, and motion detection can be performed with use of calculation results of these three steps (the DC-free difference vector diff_mean_row(k)).

Particularly, if the mean value of the absolute values of the respective elements of the DC-free difference vector diff_mean_row(k) is above a predetermined motion threshold, then it is determined that there is motion of the current frame relative to the previous frame; otherwise, it is determined that there is no motion of the current frame relative to the previous frame.

The predetermined motion threshold can be set empirically by those skilled in the art.

If the result of motion detection indicates that there is no motion of the current frame relative to the previous frame, then the determination as to flicker can be made as in the remaining flows in the first to third embodiments. If the result of motion detection indicates that there is motion of the current frame relative to the previous frame, then the DC-free difference vector diff_mean_row(k) can be recalculated as in the method of calculating a DC-free difference vector with the presence of motion to be described below in details, and then the remaining flows in the first to third embodiments can be further performed based upon the newly calculated DC-free difference vector diff_mean_row(k).

A flow chart of a method of calculating a DC-free difference vector with the presence of motion in a flicker detection method according to a fourth embodiment of the invention will be described below with reference to FIG. 5.

Figure 5:
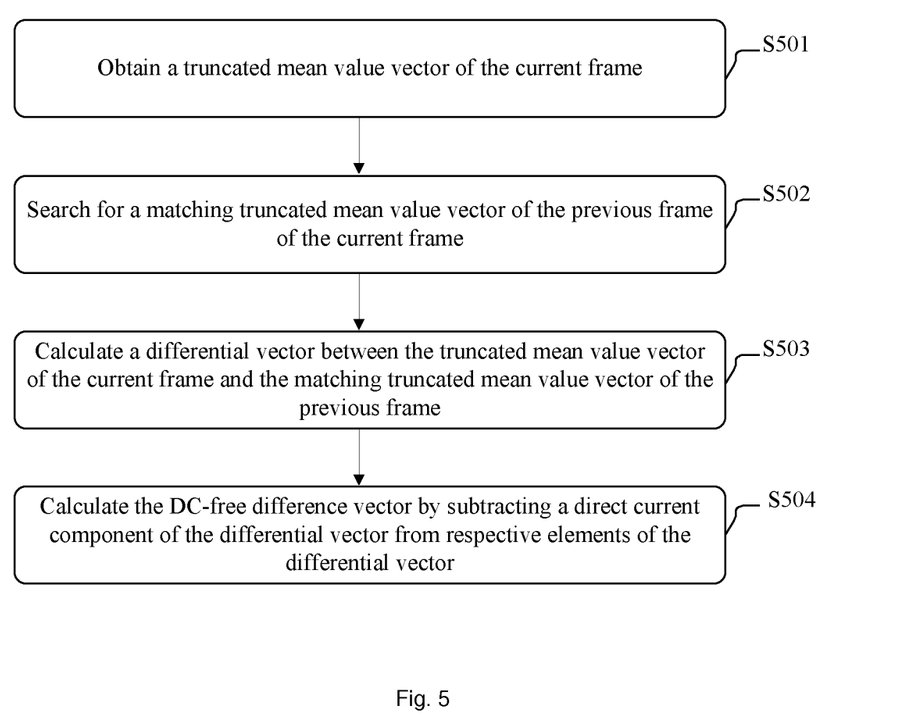
FIG. 5 illustrates a flow chart of a method of calculating a DC-free difference vector with the presence of motion in a flicker detection method according to a fourth embodiment of the invention.

FIG. 5 illustrates a flow chart of a method of calculating a DC-free difference vector with the presence of motion in a flicker detection method according to a fourth embodiment of the invention. As illustrated in FIG. 5, the method of calculating a DC-free difference vector with the presence of motion according to the invention includes the steps of: obtaining a truncated mean value vector MS_mean_row(k) of the current frame, the truncated mean value vector MS_mean_row(k) being a vector as a result of removing predetermined parts of a head and a tail of the mean value vector mean_row(k) of the current frame (the step S501); searching the mean value vector mean_row(k−1) of the previous frame of the current frame for a segment with the same length as and the most approximate to the truncated mean value vector MS_mean_row(k) of the current frame as a matching truncated mean value vector Mt_mean_row(k−1) (the step S502); calculating a differential vector diff_frame_MM(k) between the truncated mean value vector MS_mean_row(k) of the current frame and the matching truncated mean value vector Mt_mean_row(k−1) of the previous frame (the step S503); and calculating the DC-free difference vector diff_mean_row(k) by subtracting a direct current component of the differential vector diff_frame_MM(k) from respective elements of the differential vector diff_frame_MM(k) (the step S504).

The step S501 is to obtain a truncated mean value vector MS_mean_row(k) of the current frame, the truncated mean value vector MS_mean_row(k) being a vector as a result of removing predetermined parts of a head and a tail of the mean value vector mean_row(k) of the image frame.

That is, the mean value vector mean_row(k) of the image frame is calculated similarly to the first steps in the first to third embodiments, then the predetermined parts of the head and the tail of the mean value vector mean_row(k) are removed, and at this time a resulting vector is the truncated mean value vector MS_mean_row(k).

The predetermined parts are related to the length of the mean value vector mean_row(k) of the image frame and a predetermined proportion. The predetermined proportion is 0.1, for example, that is, respective first and last 10% parts of the mean value vector mean_row(k) of the image frame can be removed while taking only a middle 80% part thereof. That is, the truncated mean value vector MS_mean_row(k) corresponds to 80% of the selected rows in the middle.

The step S502 is to search the mean value vector mean_row(k−1) of the previous frame of the current frame for a segment with the same length as and the most approximate to the truncated mean value vector MS_mean_row(k) of the current frame as a matching truncated mean value vector Mt_mean_row(k−1).

Since the next step is to perform a difference operation between the vectors, the length of the matching truncated mean value vector Mt_mean_row(k−1) of the previous frame of the current frame needs to be made the same as the length of the truncated mean value vector MS_mean_row(k) of the current frame.

Moreover, an influence of motion upon flicker detection can be lowered by searching the mean value vector mean_row(k−1) of the previous frame of the current frame for the most approximate segment.

A window with the same length of the truncated mean value vector MS_mean_row(k) of the current frame can be set, and starting with the very left side of the mean value vector mean_row(k−1) of the previous frame of the current frame, the window is translated to the right by one element position and a segment in the window is taken out each time, so that there are a number of resulting candidates for the matching truncated mean value vector Mt_mean_row(k−1).

The similarities between the respective candidates and the truncated mean value vector MS_mean_row(k) of the current frame are compared, and the candidate with the highest similarity is selected as the matching truncated mean value vector Mt_mean_row(k−1).

A metric of similarity can be designed flexibly by those skilled in the art.

By way of an example, the sum of the absolute values of respective elements of a difference vector between a candidate Mt_mean_row and the truncated mean value vector MS_mean_row(k) of the current frame (matching Rate) can be calculated as a metric of similarity. The candidate with the lowest matchingRate is selected as the matching truncated mean value vector Mt_mean_row(k−1).

The step S503 is to calculate a differential vector diff_frame_MM(k) between the truncated mean value vector MS_mean_row(k) of the current frame and the matching truncated mean value vector Mt_mean_row(k−1) of the previous frame.

The step S504 is to calculate the DC-free difference vector diff_mean_row(k) by subtracting a direct current component of the differential vector diff_frame_MM(k) from respective elements of the differential vector diff_frame_MM(k).

Thus, the determination as to flicker can be made, with the DC-free difference vector diff_mean_row(k) as a result of the steps S501 to S504, in the fourth and subsequent steps in the first to third embodiments to thereby lower an influence of motion upon flicker detection and further improve the detectable rate and the accuracy of detection.

A flicker detection apparatus according to an embodiment of the invention will be described below with reference to FIG. 6.

Figure 6:
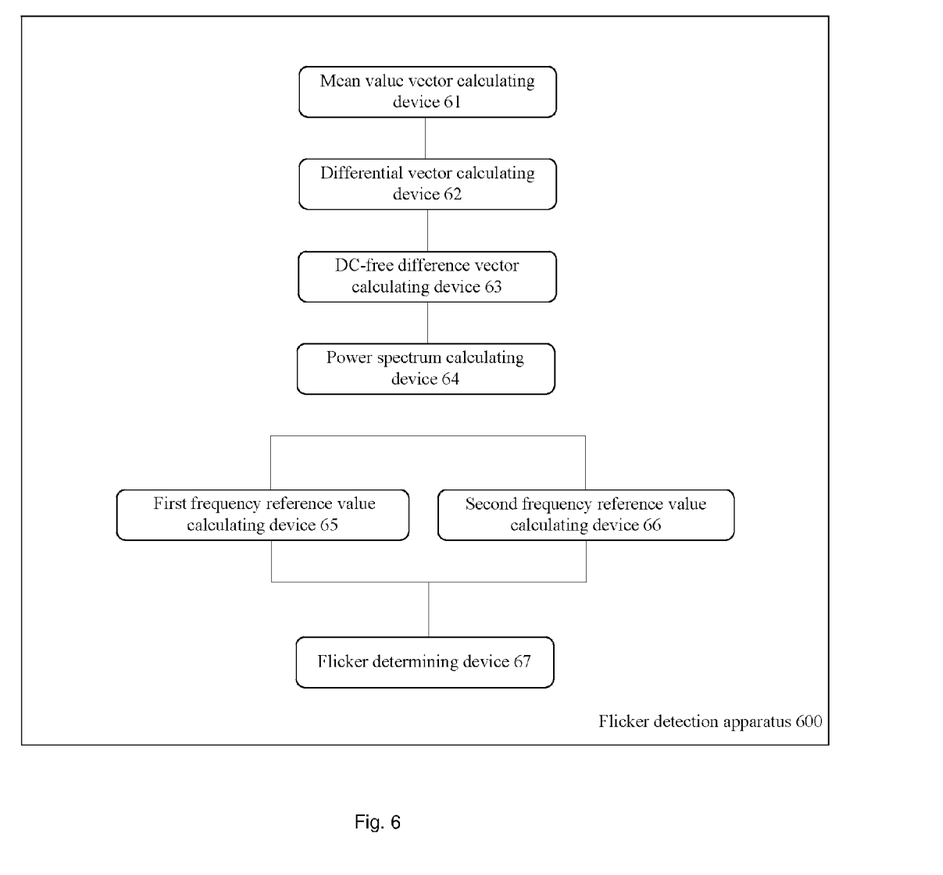
FIG. 6 illustrates a structural block diagram of a flicker detection apparatus according to an embodiment of the invention.

FIG. 6 illustrates a structural block diagram of a flicker detection apparatus according to an embodiment of the invention. As illustrated in FIG. 6, the flicker detection apparatus 600 according to the invention includes: a mean value vector calculating device 61 configured to calculate the mean values of selected rows of the image frames, the calculated mean values constituting a mean value vector mean_row(k) in the order of the rows; a differential vector calculating device 62 configured to calculate a differential vector diff_frame(k) between the mean value vector mean_row(k) of a current frame and the mean value vector mean_row(k−1) of a previous frame; a DC-free difference vector calculating device 63 configured to calculate a DC-free difference vector diff_mean_row(k) by subtracting a direct current component of the differential vector diff_frame(k) from respective elements of the differential vector diff_frame(k); a power spectrum calculating device 64 configured to calculate a power spectrum corresponding to the DC-free difference vector diff_mean_row(k); a first frequency reference value calculating device 65 configured to obtain the value of the power spectrum at a first frequency or the mean value of the power spectrum in a predetermined range around the first frequency as a first frequency reference value; a second frequency reference value calculating device 66 configured to obtain the value of the power spectrum at a second frequency or the mean value of the power spectrum in a predetermined range around the second frequency as a second frequency reference value; and a flicker determining device 67 including a presence determination unit configured: to determine that flicker is present in the current frame, if the difference between the first frequency reference value and the second frequency reference value is above a predetermined difference threshold; and to determine that no flicker is present in the current frame, if the difference between the first frequency reference value and the second frequency reference value is below or equal to the predetermined difference threshold.

In a particular embodiment, the flicker determining device 67 further includes a frequency determination unit configured so that in the case that the presence determination unit determines that flicker is present in the current frame, if the first frequency reference value is above the second frequency reference value, then the frequency determination unit determines that the frequency of the flicker is the first frequency; and if the second frequency reference value is above the first frequency reference value, then the frequency determination unit determines that the frequency of the flicker is the second frequency.

In a particular embodiment, the selected rows are all of rows of the image frames or sampled rows as a result of sampling all of rows of the image frames uniformly.

In a particular embodiment, the image frames are gray scale images.

In a particular embodiment, the flicker determining device 67 further includes a second-level determination unit configured so that for three preliminary determination results of the presence determination unit and the frequency determination unit for the current frame and the first and second frames previous to the current frame, if at least two of the determination results are that the flicker at the first frequency is present and none of the determination results are that the flicker at the second frequency is present, then the second-level determination unit further determines that the flicker at the first frequency is present in the current frame; if at least two of the determination results are that the flicker at the second frequency is present and none of the determination results are that the flicker at the first frequency is present, then the second-level determination unit further determines that the flicker at the second frequency is present in the current frame; otherwise, then the second-level determination unit further determines that no flicker is present in the current frame.

In a particular embodiment, the flicker determining device 67 further includes a third-level determination unit: including a proportion counting unit configured to count a first proportion of second-level determination results that the flicker at the first frequency is present and a second proportion of second-level determination results that the flicker at the second frequency is present among second-level determination results of M frames including the current frame and previous M−1 frames thereof; a number counting unit configured to count a first number of second-level determination results that the flicker at the first frequency is present and a second number of second-level determination results that the flicker at the second frequency is present among second-level determination results of N frames including the current frame and previous N−1 frames thereof; and a third-level determination sub-unit configured, if the first proportion is above a first proportion threshold and the second number is below 1, to further determine that the flicker at the first frequency is present in the current frame; if the second proportion is above a second proportion threshold and the first number is below 1, to further determine that the flicker at the second frequency is present in the current frame; otherwise, to further determine that no flicker is present in the current frame, wherein M and N are integers above 1 and M>N.

In a particular embodiment, the third-level determination sub-unit is further configured to determine whether there is motion of the current frame relative to the previous frame in the case that no flicker is present in the current frame.

In a particular embodiment, the flicker detection apparatus 600 further includes a motion detecting device configured to detect whether there is motion of the current frame relative to the previous frame; and in the case that a detection result of the motion detecting device indicates that there is motion of the current frame relative to the previous frame, the mean value vector calculating device 61 is configured to obtain a truncated mean value vector MS_mean_row(k) of the current frame, the truncated mean value vector MS_mean_row(k) being a vector as a result of removing predetermined parts of a head and a tail of the mean value vector mean_row(k) of the current frame; and to search the mean value vector mean_row (k−1) of the previous frame of the current frame for a segment with the same length as and the most approximate to the truncated mean value vector MS_mean_row(k) of the current frame as a matching truncated mean value vector Mt_mean_row(k−1); the differential vector calculating device 62 is configured to calculate a differential vector diff_frame_MM(k) between the truncated mean value vector MS_mean_row(k) of the current frame and the matching truncated mean value vector Mt_mean_row(k−1) of the previous frame; and the DC-free difference vector calculating device 63 is configured to calculate the DC-free difference vector diff_mean_row(k) by subtracting a direct current component of the differential vector diff_frame_MM(k) from respective elements of the differential vector diff_frame_MM (k).

In a particular embodiment, the mean value vector calculating device 61 is further configured to crop segments of the mean value vector mean_row(k−1) of the previous frame of the current frame by shifting a window with the same length as the truncated mean value vector MS_mean_row(k) of the current frame as candidate segments; to calculate the mean values of the absolute values of respective elements of difference vectors between the truncated mean value vector MS_mean_row(k) of the current frame and the respective candidate segments; and to select the candidate segment with the lowest mean value as the matching truncated mean value vector Mt_mean_row(k−1).

In a particular embodiment, the predetermined parts are related to the length of the mean value vector mean_row(k) of the image frame and a predetermined proportion.

In a particular embodiment, the motion detecting device is further configured, if the mean value of the absolute values of respective elements of the DC-free difference vector diff_mean_row(k) is above a predetermined motion threshold, to determine that there is motion of the current frame relative to the previous frame; and if the mean value of the absolute values of respective elements of the DC-free difference vector diff_mean_row(k) is below or equal to the predetermined motion threshold, to determine that there is no motion of the current frame relative to the previous frame.

Since processes in the mean value vector calculating device 61, the differential vector calculating device 62, the DC-free difference vector calculating device 63, the power spectrum calculating device 64, the first frequency reference value calculating device 65, the second frequency reference value calculating device 66, the flicker determining device 67 and the motion detecting device included in the flicker detection apparatus 600 according to the invention are similar respectively to the processes in the respective steps in the foregoing flicker detection methods, a detailed description of these modules will be omitted here for the sake of conciseness.

Furthermore, it shall be noted that the respective constituent modules and units in the foregoing apparatus can be configured in software, firmware, hardware or any combination thereof. Particular configuration means or schemes available are well-known to those skilled in the art, and a detailed description thereof will be omitted here. In the case of being embodied in software or firmware, program constituting the software or firmware can be installed from a storage medium or a network to a machine with a dedicated hardware structure (e.g., a general-purpose machine 700 illustrated in FIG. 7) which can perform various functions or the like when various types of program are installed thereon.

Figure 7:
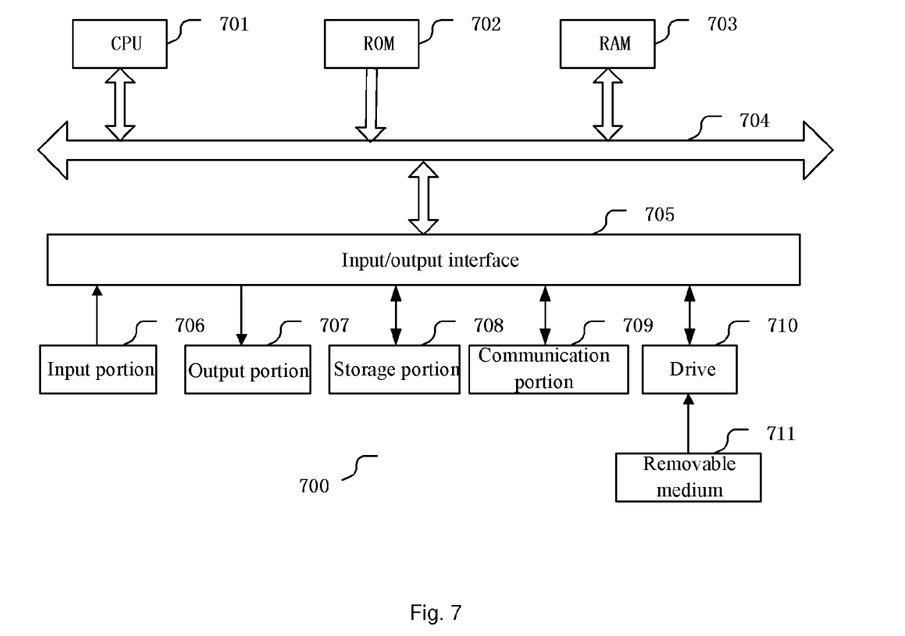
FIG. 7 illustrates a schematic block diagram of a computer in which a method and an apparatus according to an embodiment of the invention can be embodied.

FIG. 7 illustrates a schematic block diagram of a computer in which a method and an apparatus according to an embodiment of the invention can be embodied.

In FIG. 7, a Central Processing Unit (CPU) 701 performs various processes according to program stored in a Read Only Memory (ROM) 702 or loaded from a storage portion 708 into a Random Access Memory (RAM) 703 in which data required when the CPU 701 performs the various processes, etc., is also stored as needed. The CPU 701, the ROM 702 and the RAM 703 are connected to each other via a bus 704 to which an input/output interface 705 is also connected.

The following components are connected to the input/output interface 705: an input portion 706 (including a keyboard, a mouse, etc.), an output portion 707 (including a display, e.g., a Cathode Ray Tube (CRT), a Liquid Crystal Display (LCD), etc., a speaker, etc.), a storage portion 708 (including a hard disk, etc.) and a communication portion 709 (including a network interface card, e.g., an LAN card, a modem, etc). The communication portion 709 performs a communication process over a network, e.g., the Internet. A drive 710 is also connected to the input/output interface 705 as needed. A removable medium 711, e.g., a magnetic disk, an optical disk, an optic-magnetic disk, a semiconductor memory, etc., can be installed on the drive 710 as needed so that computer program fetched therefrom can be installed into the storage portion 708 as needed.

In the case that the foregoing series of processes are performed in software, program constituting the software can be installed from a network, e.g., the Internet, etc., or a storage medium, e.g., the removable medium 711, etc.

Those skilled in the art shall appreciate that such a storage medium will not be limited to the removable medium 711 illustrated in FIG. 7 in which the program is stored and which is distributed separately from the apparatus to provide a user with the program. Examples of the removable medium 711 include a magnetic disk (including a Floppy Disk (a registered trademark)), an optical disk (including a Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 702, a hard disk included in the storage portion 708, etc., in which the program is stored and which is distributed together with the apparatus including the same to the user.

Furthermore, the invention further proposes a product program on which machine readable instruction codes are stored. The instruction codes can perform the foregoing methods according to the embodiments of the invention upon being read and executed by a machine.

Correspondingly, a storage medium carrying the foregoing program product on which the machine readable instruction codes are stored will also be encompassed in the disclosure of the invention. The storage medium includes but will not be limited to a floppy disk, an optical disk, an optic-magnetic disk, a memory card, a memory stick, etc.

In the foregoing description of the particular embodiments of the invention, a feature described and/or illustrated with respect to an implementation can be used identically or similarly in one or more other implementations in combination with or in place of a feature in the other implementation(s).

It shall be emphasized that the term "including/comprising" as used in this context refers to the presence of a feature, an element, a step or a component but does not preclude the presence or addition of one or more other features, elements, steps or components.

Furthermore, the methods according to the invention will not necessarily be performed in a chronological order described in the specification but can alternatively be performed in another chronological order sequentially, concurrently or separately. Therefore the technical scope of the invention will not be limited by the order in which the methods are performed as described in the specification.

Although the invention has been disclosed above in the description of the particular embodiments of the invention, it shall be appreciated that all the foregoing embodiments and examples are illustrative but not limiting. Those skilled in the art can devise various modifications, adaptations or equivalents to the invention without departing from the spirit and scope of the appended claims. These modifications, adaptations or equivalents shall also be regarded as coming into the claimed scope of the invention.

The invention claimed is:

1. A flicker detection method of detecting flicker in a sequence of image frames, the method comprising:
    calculating mean values of selected rows of the image frames, the mean values constituting a mean value vector mean_row(k) in an order of the rows;
    calculating a differential vector diff_frame(k) between the mean value vector mean_row(k) of a current frame and the mean value vector mean_row(k−1) of a previous frame;
    calculating a DC-free difference vector diff_mean_row(k) by subtracting a direct current component of the differential vector diff_frame(k) from respective elements of the differential vector diff_frame(k);
    calculating a power spectrum corresponding to the DC-free difference vector diff_mean_row(k);
    obtaining one of a value of the power spectrum at a first frequency and a mean value of the power spectrum in a predetermined range around the first frequency as a first frequency reference value;
    obtaining one of the value of the power spectrum at a second frequency and the mean value of the power spectrum in a predetermined range around the second frequency as a second frequency reference value; and
    if a difference between the first frequency reference value and the second frequency reference value is above a predetermined difference threshold, it is determined flicker is present in the current frame;
    otherwise, it is determined no flicker is present in the current frame.

2. The method according to claim 1, wherein where flicker is present in the current frame,
    if the first frequency reference value is above the second frequency reference value, it is determined the frequency of the flicker is the first frequency; and
    if the second frequency reference value is above the first frequency reference value, it is determined the frequency of the flicker is the second frequency.

3. The method according to claim 1, wherein the selected rows are all of rows of the image frames or sampled rows as a result of sampling all of rows of the image frames uniformly.

4. The method according to claim 3, wherein the image frames are gray scale images.

5. The method according to claim 2, further comprising a second-level determination of:
    for three first-level determination results of the current frame and first and second frames previous to the current frame,
    if at least two of the determination results are that the flicker at the first frequency is present and none of the determination results are that the flicker at the second frequency is present, it is determined the flicker at the first frequency is present in the current frame;
    if at least two of the determination results are that the flicker at the second frequency is present and none of the determination results are that the flicker at the first frequency is present, it is determined the flicker at the second frequency is present in the current frame;
    otherwise, it is determined no flicker is present in the current frame.

6. The method according to claim 5, further comprising a third-level determination of:
    counting a first proportion of second-level determination results that the flicker at the first frequency is present and a second proportion of second-level determination results that the flicker at the second frequency is present among second-level determination results of M frames comprising the current frame and previous M−1 frames thereof;
    counting a first number of second-level determination results that the flicker at the first frequency is present and a second number of second-level determination results that the flicker at the second frequency is present among second-level determination results of N frames comprising the current frame and previous N−1 frames thereof;
    if the first proportion is above a first proportion threshold and the second number is below 1, it is determined the flicker at the first frequency is present in the current frame;

if the second proportion is above a second proportion threshold and the first number is below 1, it is determined the flicker at the second frequency is present in the current frame;

otherwise, it is determined no flicker is present in the current frame, wherein M and N are integers above 1 and M>N.

7. The method according to claim 6, wherein it is determined whether there is motion of the current frame relative to the previous frame in the case where it is determined no flicker is present in the current frame.

8. The method according to claim 1, wherein before the step of building, the method further comprises:

detecting whether there is motion of the current frame relative to the previous frame; and where a detection result indicates that there is motion of the current frame relative to the previous frame, calculating the DC-free difference vector diff_mean_row(k) by:

obtaining a truncated mean value vector MS_mean_row(k) of the current frame, the truncated mean value vector MS_mean_row(k) being a vector result of removing predetermined parts of a head and a tail of the mean value vector mean_row(k) of the current frame;

searching the mean value vector mean_row(k−1) of the previous frame of the current frame for a segment with a same length as and a most approximate to the truncated mean value vector MS_mean_row(k) of the current frame as a matching truncated mean value vector Mt_mean_row(k−1);

calculating a differential vector diff_frame_MM(k) between the truncated mean value vector MS_mean_row(k) of the current frame and the matching truncated mean value vector Mt_mean_row(k−1) of the previous frame; and calculating the DC-free difference vector diff_mean_row(k) by subtracting a direct current component of the differential vector diff_frame_MM(k) from respective elements of the differential vector diff_frame_MM(k).

9. The method according to claim 8, wherein searching for the matching truncated mean value vector Mt_mean_row(k−1) comprises:

cropping segments of the mean value vector mean_row(k−1) of the previous frame of the current frame by shifting a window with the same length as the truncated mean value vector MS_mean_row(k) of the current frame as candidate segments;

calculating mean values of absolute values of respective elements of difference vectors between the truncated mean value vector MS_mean_row(k) of the current frame and respective candidate segments; and selecting a candidate segment with a lowest mean value as the matching truncated mean value vector Mt_mean_row(k−1).

10. The method according to claim 8, wherein the predetermined parts are related to the length of the mean value vector mean_row(k) of the image frame and a predetermined proportion.

11. The method according to claim 8, wherein the detecting whether there is motion of the current frame relative to the previous frame comprises:

if the mean values of the absolute values of respective elements of the DC-free difference vector diff_mean_row(k) are above a predetermined motion threshold, it is determined there is motion of the current frame relative to the previous frame;

otherwise, it is determined there is no motion of the current frame relative to the previous frame.

12. A flicker detection apparatus for detecting flicker in a sequence of image frames, the apparatus comprising:

a mean value vector calculating device configured to calculate mean values of selected rows of the image frames, the mean values constituting a mean value vector mean_row(k) in an order of the rows;

a differential vector calculating device configured to calculate a differential vector diff_frame(k) between the mean value vector mean_row(k) of a current frame and the mean value vector mean_row(k−1) of a previous frame;

a DC-free difference vector calculating device configured to calculate a DC-free difference vector diff_mean_row(k) by subtracting a direct current component of the differential vector diff_frame(k) from respective elements of the differential vector diff_frame(k);

a power spectrum calculating device configured to calculate a power spectrum corresponding to the DC-free difference vector diff_mean_row(k);

a first frequency reference value calculating device configured to obtain one of a value of the power spectrum at a first frequency and a mean value of the power spectrum in a predetermined range around the first frequency as a first frequency reference value;

a second frequency reference value calculating device configured to obtain one of the value of the power spectrum at a second frequency and the mean value of the power spectrum in a predetermined range around the second frequency as a second frequency reference value; and a flicker determining device comprising a presence determination unit configured:

to determine flicker is present in the current frame, if a difference between the first frequency reference value and the second frequency reference value is above a predetermined difference threshold; and to determine no flicker is present in the current frame, if the difference between the first frequency reference value and the second frequency reference value is below or equal to the predetermined difference threshold.

13. The apparatus according to claim 12, wherein the flicker determining device further comprises a frequency determination unit configured where the presence determination unit determines flicker is present in the current frame, if the first frequency reference value is above the second frequency reference value, the frequency determination unit determines the frequency of the flicker is the first frequency; and if the second frequency reference value is above the first frequency reference value, the frequency determination unit determines the frequency of the flicker is the second frequency.

14. The apparatus according to claim 12, wherein the selected rows are all of rows of the image frames or sampled rows as a result of sampling all of rows of the image frames uniformly.

15. The apparatus according to claim 14, wherein the image frames are gray scale images.

16. The apparatus according to claim 13, wherein the flicker determining device further comprises a second-level determination unit configured where:

for three preliminary determination results of the presence determination unit and the frequency determination unit for the current frame and the first and second frames previous to the current frame, if at least two of the determination results are that the flicker at the first frequency is present and none of the determination results are that the flicker at the second frequency is present, the second-level determination unit determines the flicker at the first frequency is present in the current frame;
if at least two of the determination results are that the flicker at the second frequency is present and none of the determination results are that the flicker at the first frequency is present, the second-level determination unit determines the flicker at the second frequency is present in the current frame;
otherwise, the second-level determination unit determines no flicker is present in the current frame.

17. The apparatus according to claim 16, wherein the flicker determining device further comprises a third-level determination unit comprising:
a proportion counting unit configured to count a first proportion of second-level determination results that the flicker at the first frequency is present and a second proportion of second-level determination results that the flicker at the second frequency is present among second-level determination results of M frames comprising the current frame and previous M−1 frames thereof;
a number counting unit configured to count a first number of second-level determination results that the flicker at the first frequency is present and a second number of second-level determination results that the flicker at the second frequency is present among second-level determination results of N frames comprising the current frame and previous N−1 frames thereof; and
a third-level determination sub-unit configured:
if the first proportion is above a first proportion threshold and the second number is below 1, to determine the flicker at the first frequency is present in the current frame;
if the second proportion is above a second proportion threshold and the first number is below 1, to determine the flicker at the second frequency is present in the current frame;
otherwise, to determine no flicker is present in the current frame,
wherein M and N are integers above 1 and M>N.

18. The apparatus according to claim 12, further comprising a motion detecting device configured to detect whether there is motion of the current frame relative to the previous frame; and
where a detection result of the motion detecting device indicates that there is motion of the current frame relative to the previous frame,
the mean value vector calculating device is configured:
to obtain a truncated mean value vector MS_mean_row(k) of the current frame, the truncated mean value vector MS_mean_row(k) being a vector result of removing predetermined parts of a head and a tail of the mean value vector mean_row(k) of the current frame; and
to search the mean value vector mean_row(k−1) of the previous frame of the current frame for a segment with a same length as and a most approximate to the truncated mean value vector MS_mean_row(k) of the current frame as a matching truncated mean value vector Mt_mean_row(k−1);
the differential vector calculating device is configured to calculate a differential vector diff_frame_MM(k) between the truncated mean value vector MS_mean_row(k) of the current frame and the matching truncated mean value vector Mt_mean_row(k−1) of the previous frame; and
the DC-free difference vector calculating device is configured to calculate the DC-free difference vector diff_mean_row(k) by subtracting a direct current component of the differential vector diff_frame_MM(k) from respective elements of the differential vector diff_frame_MM(k).

19. The apparatus according to claim 18, wherein the mean value vector calculating device is further configured:
to crop segments of the mean value vector mean_row(k−1) of the previous frame of the current frame by shifting a window with the same length as the truncated mean value vector MS_mean_row(k) of the current frame as candidate segments;
to calculate the mean values of the absolute values of respective elements of difference vectors between the truncated mean value vector MS_mean_row(k) of the current frame and the respective candidate segments; and
to select the candidate segment with the lowest mean value as the matching truncated mean value vector Mt_mean_row(k−1).

20. The apparatus according to claim 18, wherein the motion detecting device is further configured:
if the mean value of the absolute values of respective elements of the DC-free difference vector diff_mean_row(k) is above a predetermined motion threshold, to determine there is motion of the current frame relative to the previous frame; and
if the mean value of the absolute values of respective elements of the DC-free difference vector diff_mean_row(k) is below or equal to the predetermined motion threshold, to determine there is no motion of the current frame relative to the previous frame.

21. A flicker detection method of detecting flicker in a sequence of image frames, the method comprising:
calculating mean values of selected rows of the image frames, the calculated mean values constituting a mean value vector in an order of the rows;
calculating a differential vector between the mean value vector of a current frame and the mean value vector of a previous frame;
calculating a DC-free difference vector by subtracting a direct current component of the differential vector from respective elements of the differential vector;
calculating a power spectrum corresponding to the DC-free difference vector;
obtaining a value of the power spectrum at one of a first frequency and the mean value of the power spectrum in a predetermined range around the first frequency as a first frequency reference value;
obtaining the value of the power spectrum at one of a second frequency and the mean value of the power spectrum in a predetermined range around the second frequency as a second frequency reference value; and
if a difference between the first frequency reference value and the second frequency reference value is above a predetermined difference threshold, flicker is present in the current frame;
otherwise, no flicker is present in the current frame.

* * * * *